United States Patent
Beverly

(10) Patent No.: US 9,141,804 B2
(45) Date of Patent: *Sep. 22, 2015

(54) PROCESSOR BOOT SECURITY DEVICE AND METHODS THEREOF

(71) Applicant: QUALCOMM Incorporated, San Diego, CA (US)

(72) Inventor: Harlan T. Beverly, McDade, TX (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/858,503

(22) Filed: Apr. 8, 2013

(65) Prior Publication Data

US 2013/0227266 A1 Aug. 29, 2013

Related U.S. Application Data

(63) Continuation of application No. 12/570,338, filed on Sep. 30, 2009, now Pat. No. 8,443,181.

(60) Provisional application No. 61/101,487, filed on Sep. 30, 2008.

(51) Int. Cl.
G06F 15/177 (2006.01)
G06F 21/57 (2013.01)
G06F 12/14 (2006.01)
(Continued)

(52) U.S. Cl.
CPC ............ *G06F 21/575* (2013.01); *G06F 9/4416* (2013.01); *G06F 12/1433* (2013.01); *G06F 21/79* (2013.01)

(58) Field of Classification Search
CPC ..... G06F 12/1433; G06F 21/575; G06F 21/79; G06F 9/4416
USPC ......................................................... 713/1, 2
See application file for complete search history.

(56) References Cited

U.S. PATENT DOCUMENTS

| | | |
|---|---|---|
| 7,073,064 B1 | 7/2006 | Angelo et al. |
| 7,424,398 B2 | 9/2008 | Booth et al. |
| 7,467,304 B2 | 12/2008 | Bar-El et al. |

(Continued)

OTHER PUBLICATIONS

International Search Report for—PCT/US2009/058962—ISA/EPO—Apr. 30, 2010.

(Continued)

*Primary Examiner* — Zahid Choudhury
(74) *Attorney, Agent, or Firm* — DeLizio Law, PLLC

(57) ABSTRACT

A method of securing network authentication information at a data processing device includes determining a boot source from which to boot the device and comparing the boot source to an expected source. If the boot source is not the expected source, access to the network authentication information is inhibited, such as by disabling access to the portion of memory that stores the authentication information. Further, if the boot source is the expected source, boot code authentication information is retrieved from memory and verified during the boot sequence. If the device authentication information is not authenticated, access to the network authentication information is inhibited. Accordingly, access to the network authentication information is allowed only if the data processing device is booted from an expected source, and only if the boot code is authenticated, thereby reducing the likelihood of unauthorized access to the network authentication information.

21 Claims, 4 Drawing Sheets

(51) Int. Cl.
    *G06F 21/79* (2013.01)
    *G06F 9/44* (2006.01)

(56) References Cited

U.S. PATENT DOCUMENTS

| | | |
|---|---|---|
| 7,506,381 B2 | 3/2009 | Sormunen et al. |
| 7,757,098 B2 | 7/2010 | Brannock et al. |
| 7,937,575 B2 | 5/2011 | Hajji et al. |
| 2003/0140238 A1 | 7/2003 | Turkboylari |
| 2005/0138409 A1 | 6/2005 | Sheriff et al. |
| 2006/0090084 A1 | 4/2006 | Buer |
| 2006/0179308 A1 | 8/2006 | Morgan et al. |
| 2008/0086629 A1* | 4/2008 | Dellow ............... 713/2 |
| 2008/0141017 A1 | 6/2008 | McCoull et al. |
| 2010/0082968 A1 | 4/2010 | Beverly |
| 2010/0228997 A1 | 9/2010 | Cheng et al. |

OTHER PUBLICATIONS

"U.S. Appl. No. 12/570,338 Final Office Action", Oct. 25, 2012, 12 Pages.
"U.S. Appl. No. 12/570,338 Office Action", Apr. 18, 2012, 11 pages.
"Written Opinion—PCT/US2009/058962—ISA/EPO—Apr. 30, 2010", 5 pages.

\* cited by examiner

PROCESSOR BOOT SECURITY DEVICE AND METHODS THEREOF

CROSS-REFERENCE TO RELATED APPLICATION(S)

This patent application is a continuation of U.S. application Ser. No. 12/570,338 filed Sep. 30, 2009, which claims priority to U.S. Provisional Patent Application No. 61/101,487, entitled "Local connection routing mechanism for unique data with specifically requested destinations" filed on Sep. 30, 2008, which is assigned to the current assignee hereof and is incorporated herein by reference in its entirety.

BACKGROUND

1. Field of the Disclosure

The present disclosure relates to data processing devices and more particularly to boot systems for data processing devices.

2. Description of the Related Art

Security of communications is an increasingly important concern. For example, in a communications network, it is frequently desirable to have communications between network nodes be secured. One method of securing communications is to have the network nodes exchange authentication information such as passwords, public key, or private key information. Each node verifies the authentication information according to a defined security protocol, and only communicates designated information to the other node if the authentication information is verified. The authentication information is typically stored at each node. However, such authentication information can be subject to unauthorized access, allowing the authentication information to be misappropriated.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A method of securing network authentication information at a data processing device includes determining a boot source from which to boot the device and comparing the boot source to an expected source. If the boot source is not the expected source, access to the network authentication information is inhibited, such as by disabling access to the portion of memory that stores the authentication information. Further, if the boot source is the expected source, boot code authentication information is retrieved from memory and verified during the boot sequence. If the device authentication information is not authenticated, access to the network authentication information is inhibited. Accordingly, access to the network authentication information is allowed only if the data processing device is booted from an expected source, and only if the boot code is authenticated, thereby reducing the likelihood of unauthorized access to the network authentication information.

Figure 1:
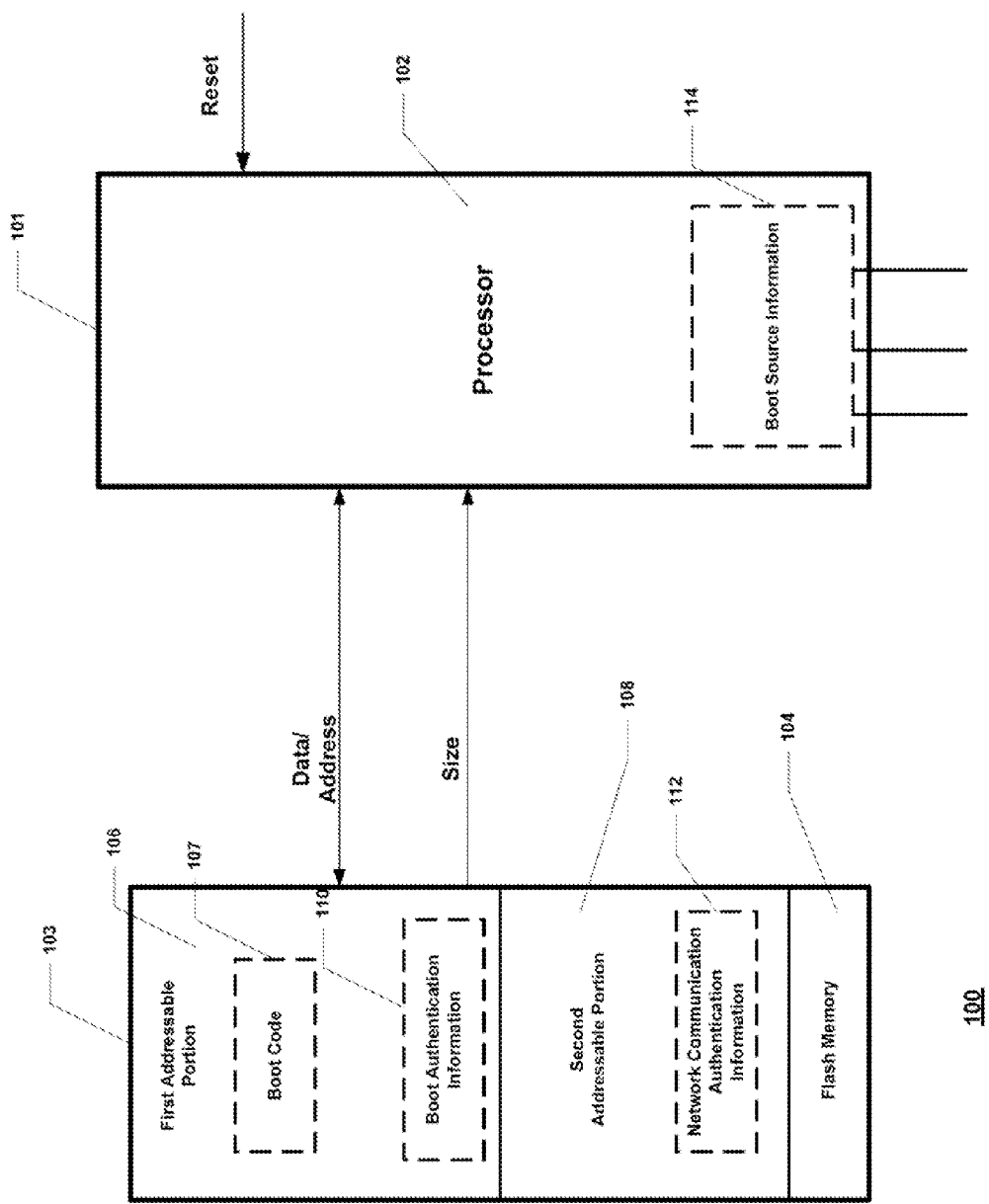
FIG. 1 is a block diagram of a data processing device in accordance with one embodiment of the present disclosure.

Referring to FIG. 1, a block diagram of a data processing device 100 in accordance with one embodiment of the present disclosure. In the illustrated embodiment, data processing device 100 includes two integrated circuit packages, numbered 101 and 103 respectively. Integrated circuit package 101 includes a processor 102 while integrated circuit package 103 includes a flash memory 104. Processor 102 includes an input/output port connected to a bus labeled "Data/Address", an input to receive a signal labeled "Reset", and an input to receive a signal labeled "Size." Flash memory 104 includes an output to provide the Size signal. It will be appreciated that any signal described herein could be composed of one or more individual signals, each communicated via one or more signal lines. Further, the Data/Address bus can be composed of one or more individual busses, each having one or more signal lines. In addition in other embodiments one or more portions of the information described herein could be provided via a register or other internal module of the processor 102 or the memory 104. For example, in one embodiment the processor 102 can determine the size of the memory 104 by reading a register of the memory 104. Such a register could be a read only register or a read and write register.

Processor 102 is a processing device, such as general purpose processor or application specific integrated circuit, configured to execute instructions to perform designated tasks. The processor 102 is further configured to perform a boot sequence in response to receiving a reset indication via the Reset signal. The reset indication can be generated in response to the data processing device being powered on, in response to actuation of a reset button or other input, in response to a request from software or received over a network connection (not shown), and the like.

Processor 102 includes a register 114 to store boot source information. In the illustrated embodiment, it is assumed that the boot source information indicates an address in memory. In response to the reset indication, the processor 102 performs the boot sequence by accessing the memory location indicated by the address stored at register 114 and executing instructions stored at the memory location. To illustrate, if the address stored at the register 114 indicates an address associated with the flash memory 104, in response to the reset indication the processor 102 communicates the address to the flash memory 104 via the Data/Address bus. In response, the processor 102 receives instruction information stored at the indicated address, and executes the instruction information. In an embodiment, the retrieved instruction information can indicate additional memory locations that store instructions to be executed in response to the reset signal. For purposes of discussion, the code retrieved and executed by the processor 102 until an operating system is loaded at the processor is referred to herein as "boot code." Further, the sequence of operations performed by the processor 102 up to and including when the operating system is loaded is referred to as the boot sequence.

The boot sequence can include operations in addition to the execution of boot code, such as initialization of memory devices, peripherals, and the like. For example, in the illustrated embodiment, during the boot sequence the processor 102 determines a size of the flash memory 104 based on the Size signal. The size of the flash memory 104 indicates a number of addressable memory locations of the memory. In an embodiment, the size is expressed as a physical address range of the number of memory locations at the flash memory 104.

The flash memory 104 includes two portions, labeled first addressable portion 106 and second addressable portion 108. Each addressable portion includes memory locations to store information, with each memory location having a physical address. In response to receiving an address via the Data/Address bus, the flash memory 104 can translate the received address information to a physical address and retrieve the information from memory location associated with the physical address.

In the illustrated embodiment, the flash memory 104 is assumed to be a one time programmable (OTP) flash memory. In one embodiment, the flash memory 104 is configured as an OTP memory by securing a write-protect pin of the memory to a relatively fixed voltage so that the memory is not write-enabled. Because it is configured as an OTP memory, once information is stored at a particular location of memory, it typically cannot be overwritten by the processor 102. In the illustrated embodiment, the first addressable portion 106 stores boot code 107 and boot authentication information 110. The second addressable portion 108 stores network communication authentication information 112.

During operation, the processor 102 can receive a reset indication via the Reset signal. In response, the processor 102 determines the size of the flash memory 104 based on the signal Size. The flash memory 104 restricts access to the network communication authentication information 112 by indicating via the Size signal that only the first addressable portion 106 is available. For example, if flash memory 104 is a 16 megabyte (MB) memory, with the first addressable portion 106 composed of the first 8 addressable 8 MB, flash memory 104 may indicate via the Size signal that it is an 8 MB memory, so that processor 102 is only made aware of the first addressable portion 106. Accordingly, unless otherwise instructed, the processor 102 will assume that the flash memory 104 includes a smaller number of addressable locations that it actually has, and will not be aware of the second addressable portion 108. In another embodiment, the boot code 107 retrieved from the flash memory 104 can include one or more instructions to override the size information indicated by the Size signal and indicate that the flash memory 104 is smaller than its actual size. In this embodiment, the processor 102 does not read the size signal and instead the boot code 107 instructs the processor that the flash memory 104 is of a size smaller than its actual size.

In addition, in response to the reset indication, processor 102 determines the boot source by accessing the register 114. For an authorized boot, it is assumed that the register 114 stores address information indicating a memory location at the first addressable portion 106. Accordingly, during an authorized boot of the processor 102, it retrieves boot code 107 from the first addressable portion 106. In executing the boot code 107, the processor 102 compares the actual boot source, as indicated by the address at the register 114, with the expected boot source, as indicated by the boot code 107. If the actual boot source and the expected boot source do not match, the processor 102 can halt the boot sequence. Thus, if an attempt is made to boot the processor 102 from an unauthorized boot source, the boot sequence can be halted before an operating system or other program is loaded, thereby rendering the network communication authentication information 112 inaccessible to the operating system.

In addition, during execution of the boot code 107, the processor 102 retrieves the boot authentication information 110 from the first addressable portion 106. The boot authentication information 110 can be a password, public key information, private key information, and the like. In an embodiment, the boot authentication information 110 includes a public key that can be used to decrypt additional boot code. In particular, the boot code 107 may include a digital signature (e.g. a hash) that has been encrypted using a private key. The processor 102 decrypts the digital signature and compares it to an expected signature to authenticate the entire boot code. In another embodiment, the boot authentication information 110 includes the algorithm used to decrypt the digital signature. Further, the boot code 107 can be authenticated using any public-private or private-public authentication process, such as Digital Signature Algorithm (DSA), RSA process, and the like.

In response to determining the boot code 107 is authentic, the processor 102 continues the boot process, such as by executing additional instructions of the boot code. In an embodiment, the boot code instructs the processor 102 to retrieve the network communication information 112 from the second addressable portion 108. In particular, the boot code instructs the processor 102 to communicate an address to the flash memory 104 that is outside the address range of the flash memory 104 indicated by the Size signal. The flash memory 104 translates the address to a physical address associated with the second addressable portion 108 and retrieves the information stored at the indicated location. Thus, the processor 102 is only made aware of the second addressable portion 108 by the boot code after the boot code has been authenticated. If the boot code is not authenticated, the processor 102 will continue to assume that the size of the flash memory 104 is such that it does not include the second addressable portion 108. Accordingly, any operating system or other program executed by the processor 108 will likewise be unaware of the second addressable portion 108, and will therefore be unlikely to access the network communication authentication information 112.

The security provided by the techniques described herein can be better understood with reference to an example where an attempt is made to boot the data processing device 100 with unauthorized boot code. The unauthorized boot can be attempted by storing boot source information at the register 114 indicating an unauthorized boot location. For example, the unauthorized boot may store address information at the register 114 instructing the processor 102 to boot from a memory external to the data processing device 100 where unauthorized boot code is stored. In response, the processor 102 can determine that the actual boot source, as indicated by the address stored at register 114, is different from the expected boot source (as indicated by a defined address value stored at the processor 102 or elsewhere at the data processing device 102). In response to determining the actual boot source is not the expected boot source, processor 102 can take appropriate action, including halting the boot sequence or setting an internal register (not shown) to indicate that the flash memory 104 is of a size such that it does not include the second addressable portion 108, thereby making it more difficult to access the network communication authentication information 112. For example, the processor 102 may cease execution of any boot code, may decline to load an operating system or other program, or the like.

An unauthorized boot can also be attempted by replacing one or more portions of the boot code stored at the first addressable portion 106 with unauthorized boot code. In that case, the processor 102 will determine that the unauthorized boot code cannot be authenticated by the boot authentication information 110. In response, processor 102 can halt the boot sequence as described above.

Further, in response to an unauthorized boot, whether the processor 102 determines an unauthorized boot based on the boot source or based on authentication of the boot code, access to the network communication information 112 will be inhibited. In particular, unless the authorized boot code is executed, the processor 102, and all programs executed by the processor 102, will access the flash memory 104 based on the smaller size indicated by the Size signal or the size information provided by the boot code 107. That is, the processor 102 will only access the first addressable portion 106. Only the authorized boot code will inform the processor 102 that the flash memory 104 includes the second addressable portion 108, thereby allowing access to the network communication information 112.

The network communication authentication information 112 can be one or more public or private keys that can be provided in response to requests from nodes in a network (not shown). In particular, after an authorized boot, the processor 102 can receive via a network connection (not shown) a request to authenticate the data processing device 100. In an embodiment, the request is received from a node in the network located remotely from the data processing device 100. In response to the request, the processor 102 can retrieve the network communication authentication information 112 and provide it to the requesting node, allowing authentication of the data processing device 100. Once authenticated, the processor 102 can communicate with the remote node in a secure fashion. The network authentication information 112 can also include authentication information to authenticate the identity of the remote node at the processor 102.

Accordingly, if the data processing device 100 is booted from an unauthorized source or using unauthorized boot code, the network communication authentication information is unlikely to be available to the processor 102. Therefore, the data processing device 100 cannot be properly authenticated to remote nodes via a network, thereby reducing the likelihood that the data processing device 100 can be used by a hacker or other unauthorized person to access secure network nodes.

Figure 2:
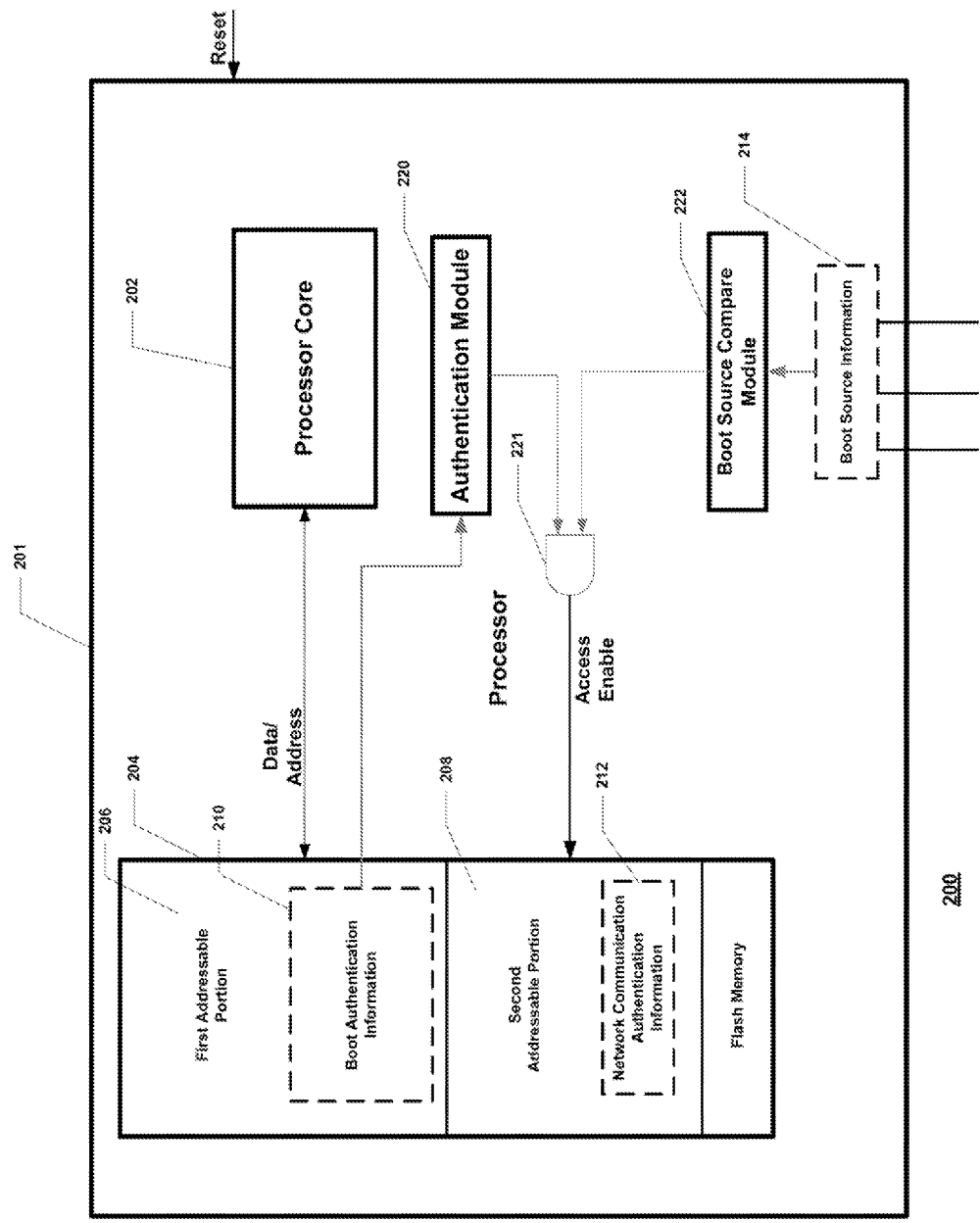
FIG. 2 is a block diagram illustrating a data processing device in accordance with another embodiment of the present disclosure.

Referring to FIG. 2, a block diagram of a data processing device 200 in accordance with one embodiment of the present disclosure is illustrated. The data processing device 100 includes an integrated circuit package 201 having a processor core 202, a flash memory 204, an authentication module 220, a boot source compare module 222, AND gate 221, and a register 214. The processor 202, flash memory 204, and register 214 are configured similarly to the corresponding numbered items of the data processing device 100. For example, the flash memory 204 can be configured as OTP memory, or configured such that it cannot be written to until it receives an indication of an authorized boot sequence. In addition, flash memory 204 includes an input to receive a signal labeled "Access Enable." Authentication module 220 includes an input connected to an output of the flash memory 204 and an output. Boot source compare module 222 includes an input connected to the register 214 and an output. AND gate 221 includes an input connected to the output of authentication module 220, an input connected to the output of the boot source compare module 222, and an output to provide the Access Enable signal.

The data processing device 200 is configured to boot similarly to the data processing device 100, but is configured to use hardware modules to perform the boot source comparison and the authentication of the boot code. In particular, boot source compare module 222 is configured to compare the actual boot source, as indicated by address information stored at the register 214, to an expected boot source. In the event the actual boot source matches the expected boot source, boot source compare module 222 asserts a signal at its output to indicate the boot source is authorized.

Authentication module 220 can be software stored in the first addressable portion 206 and executing on the processor core 202, a field programmable gate array, or other logic module, or any combination thereof. The authentication module 220 is configured to execute an authentication algorithm based on boot authentication information 210 provided by the first addressable portion 216 of the flash memory 204 during the boot sequence. In response to determining the boot authentication information 210 indicates authentic boot code, the authentication module 220 asserts a signal at its output.

AND gate 221 logically combines the signals at its input and asserts the Access Enable signal in response to both input signals being asserted. Accordingly, the Access Enable signal will be asserted only if the authentication module 220 determines the boot code is authentic and if the boot source compare module determines the boot code is located at an authorized boot source.

The flash memory 204 is configured to permit access to information stored at the second addressable portion 208, including network communication authentication information 214, only when the Access Enable signal is asserted. For example, if the Access Enable signal is asserted, flash memory 204 can return an error indication in response to any attempt to read information from the second addressable portion 208. Accordingly, access to the network communication authentication information 214 is permitted only if the boot source is authorized and only if the boot code is authenticated.

In the illustrated embodiment of FIG. 2, the flash memory 204 and the processor 202 are incorporated in a common integrated circuit package. This makes it more difficult for a hacker or other unauthorized person to perform an unauthorized boot by replacing the flash memory 204. In particular, it is difficult to remove only a portion of an integrated circuit and replace it with another portion without rendering the entire integrated circuit inoperable. Accordingly, any attempt to replace the flash memory 204 with another memory module would likely result in the entire data processing device 200 being rendered inoperable. Thus, the illustrated embodiment can render it more difficult to perform an unauthorized access of the network communication authentication information 212, or otherwise perform an unauthorized boot of the data processing device 200 without rendering the entire device 200 as inoperable. For example, the device 200 can be booted using unauthorized boot code such that the device operates without access to the network communication authentication information 212 but otherwise operates normally.

Figure 3:
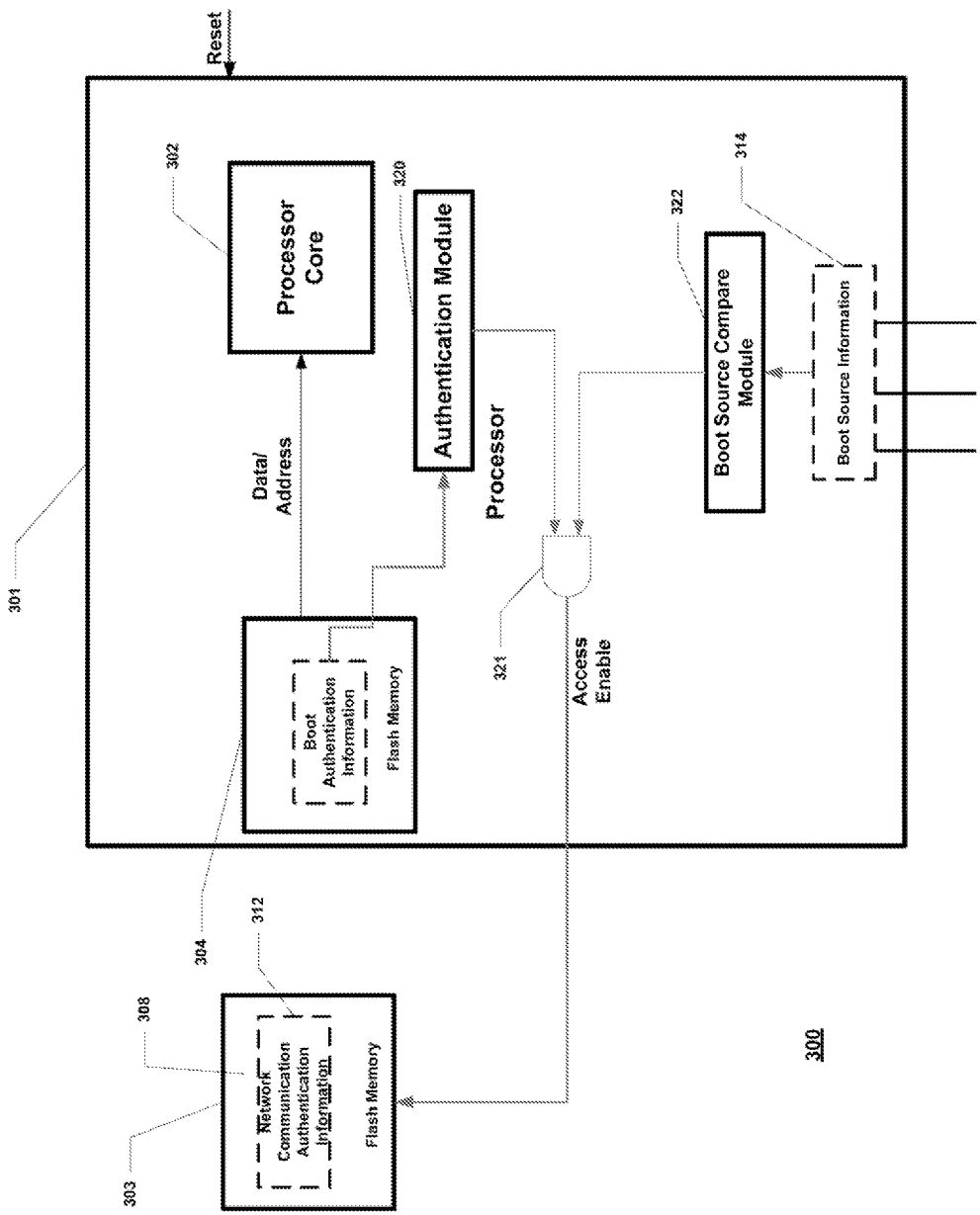
FIG. 3 is a block diagram illustrating a data processing device in accordance with another embodiment of the present disclosure.

FIG. 3 illustrates a block diagram of a data processing device 300 in accordance with one embodiment of the present disclosure is illustrated. The data processing device 300 includes an integrated circuit package 301 having a processor core 302, a flash memory 304, an authentication module 320, a boot source compare module 322, AND gate 321, and a register 314. The data processing device 300 also includes an integrated circuit package including a flash memory 308. The processor 302, flash memory 304, and other modules of the data processing device are configured similarly to the corresponding numbered items of the data processing device 300. However, in the illustrated embodiment the addressable portions of the flash memory are separated into two flash memories, with the boot authentication information being stored in an internal flash memory 304 and the network authentication information being stored in the external flash memory 308.

In the illustrated embodiment, the illustrated modules perform similar functions as the corresponding modules of the data processing device 200 of FIG. 2. Accordingly, access to the flash memory 308 is provided only if both the boot source and the boot code are authenticated. However, in the illustrated embodiment the network communication authentication information 314 is stored in the external flash memory 308, so that it can be more easily replaced. This allows the network communication authentication 314 information to be more easily changed, which can be desirable to update the authentication information. However, access to the network communication authentication information 314 is still disabled if the boot source and the boot code are not authenticated.

Figure 4:
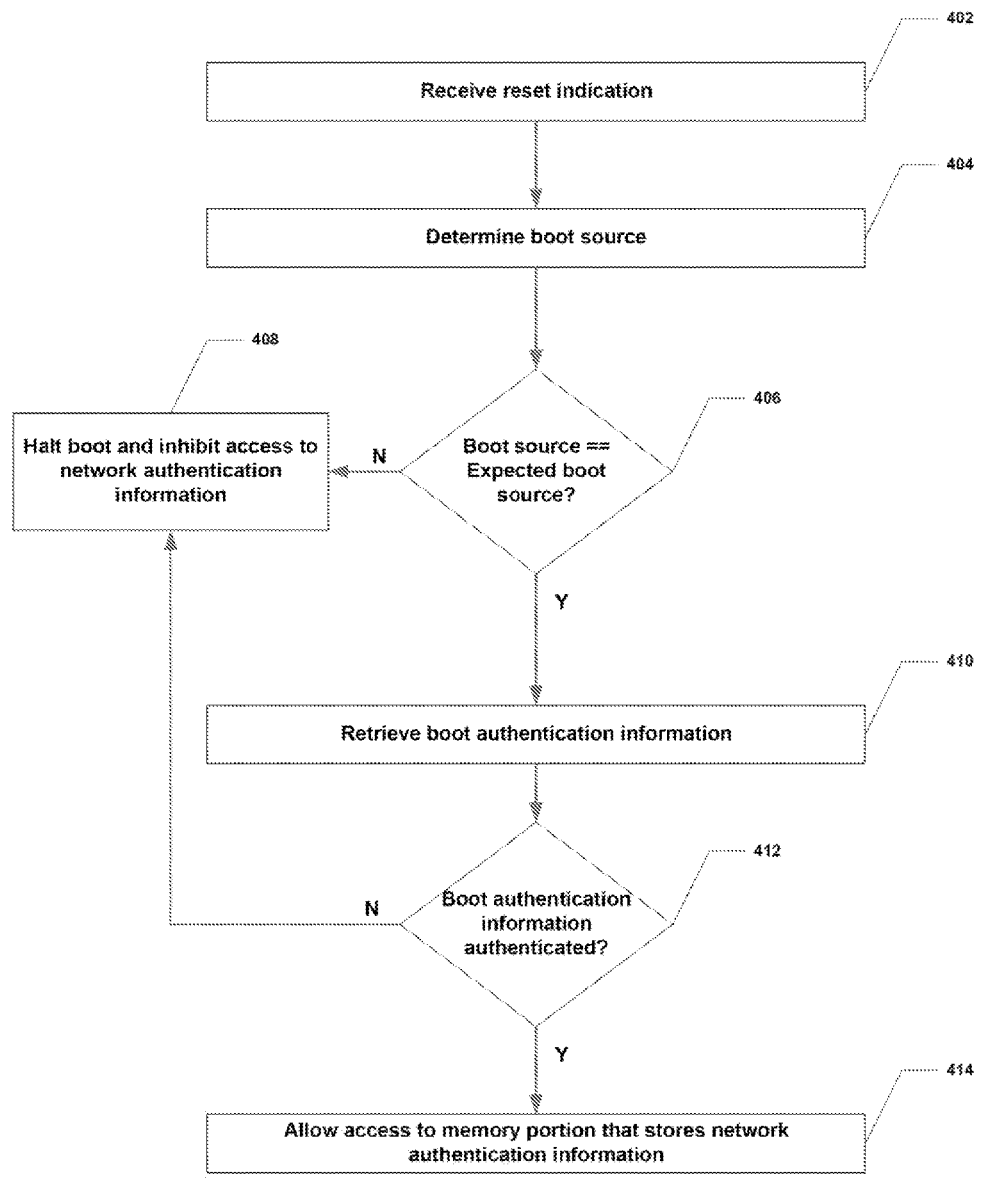
FIG. 4 is a flow diagram of a method of booting a data processing device in accordance with one embodiment of the present disclosure.

Referring to FIG. 4, a flow diagram of a method of booting a data processing device is illustrated. At block 402, a reset indication is received at the data processing device. At block 404, the data processing device determines a source, such as a memory device, from which boot code is to be retrieved. At block 406, the data processing device compares the actual boot source to an expected boot source. If the actual boot source does not match an expected boot source, the method flow moves to block 408 and the data processing device halts the boot sequence. In addition, the data processing device inhibits access to a portion of memory that stores network communication authentication information. For example, the data processing device can inhibit access by disabling access to that portion of memory, by declining to enable access to that portion, by indicating the memory is of a size such that it does not include the portion that stores the authentication information, and the like.

Returning to block 408, if the data processing device determines that the actual boot source matches the expected boot source, the method flow moves to block 410 and the data processing device retrieves boot code authentication information, such as a password, public key, private key, a combination thereof, and the like. At block 412, the data processing device determines whether the boot authentication information indicates the boot code to be executed is authorized to be executed. If not, the method flow moves to block 408, the boot sequence is halted, and access to the network communication authentication information is inhibited. If the data processing device determines the boot code is authorized, the method flow moves to block 414, and the data processing device permits access to the portion of memory that stores the network communication authentication information.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory device, comprising:
    a memory component having a first addressable portion and a second addressable portion;
    an output of the memory device configured to indicate a size of the memory device to a processor device, the output configured to indicate the size of the first addressable portion;
    the first addressable portion configured to store boot code having first instructions for authenticating the boot code and having second instructions that identify an address to network authentication information stored in the second addressable portion upon authenticating the boot code; and
    the second addressable portion configured to store the network authentication information.

2. The memory device of claim 1, wherein the address is out-of-range of the first addressable portion, the memory device further comprising:
    an interface configured to receive the address and translate the address to a physical address associated with the second addressable portion.

3. The memory device of claim 1, wherein the memory device is incorporated in an integrated circuit package for use in the processor device.

4. The memory device of claim 1, wherein the memory device further comprises a register for indicating the size of the memory device, the register configured to indicate the size of the first addressable portion.

5. The memory device of claim 1, wherein the memory device comprises a one-time programmable (OTP) flash memory.

6. The memory device of claim 1, further comprising:
    an input configured to receive an access enabled signal and enable access to the second addressable portion in response to the access enabled signal.

7. A method, comprising:
    initiating a boot sequence in response to a reset indication at a processing device, said boot sequence including the operations of:
        determining that a memory device is of a first size based, at least in part, on a size signal from the memory device, the first size associated with a first addressable portion of the memory device, and
        retrieving a first boot code from the first addressable portion of the memory device, the first boot code identifying an expected boot source address in the first addressable portion; and
    executing the first boot code, said executing the first boot code including the operations of:
        comparing an actual boot source address, stored at a local register of the processing device, with the expected boot source address, and
        halting the boot sequence in response to determining the actual boot source address does not match the expected boot source address.

8. The method of claim 7, further comprising continuing execution the first boot code in response to determining that the actual boot source address matches the expected boot source address.

9. The method of claim 7, wherein said executing the first boot code comprises:
    authenticating the first boot code using boot authentication information from the first addressable portion of the memory device; and
    retrieving information from a second addressable portion of the memory device in response to authenticating the first boot code.

10. The method of claim 9, wherein said information from the second addressable portion of the memory device includes network authentication information.

11. The method of claim 7, wherein said halting the boot sequence includes inhibiting access to the memory device.

12. The method of claim 7, wherein said executing the first boot code comprises:
    enabling access to network authentication information stored at the memory device in response to determining that the actual boot source address matches the expected boot source address.

13. A non-transitory machine-readable storage medium having instructions stored therein, which when executed by one or more processors causes the one or more processors to perform operations that comprise:
  initiating a boot sequence in response to a reset indication at a processing device, said boot sequence including the operations of:
    determining that a memory device is of a first size based, at least in part, on a size signal from the memory device, the first size associated with a first addressable portion of the memory device, and
    retrieving a first boot code from the first addressable portion of the memory device, the first boot code identifying an expected boot source address in the first addressable portion; and
  executing the first boot code, said executing the first boot code including the operations of:
    comparing an actual boot source address, stored at a local register of the processing device, with the expected boot source address, and
    halting the boot sequence in response to determining the actual boot source address does not match the expected boot source address.

14. The non-transitory machine-readable storage medium of claim 13, wherein the operations further comprise continuing execution the first boot code in response to determining that the actual boot source address matches the expected boot source address.

15. The non-transitory machine-readable storage medium of claim 13, wherein said executing the first boot code comprises:
  authenticating the first boot code using boot authentication information from the first addressable portion of the memory device; and
  retrieving information from a second addressable portion of the memory device in response to authenticating the first boot code.

16. The non-transitory machine-readable storage medium of claim 15, wherein said information from the second addressable portion of the memory device includes network authentication information.

17. The non-transitory machine-readable storage medium of claim 13, wherein said halting the boot sequence includes inhibiting access to the memory device.

18. The non-transitory machine-readable storage medium of claim 13, wherein said executing the first boot code comprises:
  enabling access to network authentication information stored at the memory device in response to determining that the actual boot source address matches the expected boot source address.

19. A data processing system, comprising:
  an internal flash memory configured to store boot authentication information;
  an external flash memory configured to store network authentication information; and
  a processor configured to:
    retrieve, from a boot source address, a first boot code from the internal flash memory;
    determine that the boot source address matches an expected boot source address;
    authenticate the first boot code by decrypting a digital signature based, at least in part, on a boot authentication information; and
    access the external flash memory in response to a determination that the boot source address matches the expected boot source address and in response to authentication of the first boot code.

20. The data processing system of claim 19, wherein access to the external flash memory is inhibited in response to a determination that the boot source address does not match the expected boot source address or upon failure to authenticate the first boot code.

21. The data processing system of claim 19, wherein access to the external flash memory is replaceable with other external flash memory configured to store replacement network authentication information.

* * * * *